(12) United States Patent
Andri

(10) Patent No.: US 7,775,310 B2
(45) Date of Patent: Aug. 17, 2010

(54) DYNAMIC ALLOCATION OF ENERGY STORAGE LIMITS FOR A HYBRID VEHICLE PROPULSION SYSTEM

(75) Inventor: Michael Andri, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 1232 days.

(21) Appl. No.: 11/346,896

(22) Filed: Feb. 3, 2006

(65) Prior Publication Data

US 2007/0181354 A1 Aug. 9, 2007

(51) Int. Cl.
| | |
|---|---|
| B60W 10/06 | (2006.01) |
| B60W 20/00 | (2006.01) |
| B60W 10/04 | (2006.01) |
| B60W 10/24 | (2006.01) |
| F02B 75/18 | (2006.01) |

(52) U.S. Cl. .............. 180/65.28; 122/52.1; 180/65.285; 180/65.29

(58) Field of Classification Search .............. 180/65.21, 180/65.22, 65.225, 65.23, 65.235, 65.24, 180/65.245, 65.25, 65.26, 65.265, 65.27, 180/65.275, 62.28, 65.285, 65.29

See application file for complete search history.

(56) References Cited

U.S. PATENT DOCUMENTS

| | | | | |
|---|---|---|---|---|
| 5,806,617 A | * | 9/1998 | Yamaguchi | ............ 180/65.235 |
| 6,390,054 B1 | * | 5/2002 | Yang | ........................ 123/295 |
| 6,484,833 B1 | * | 11/2002 | Chhaya et al. | ......... 180/65.225 |
| 6,570,265 B1 | * | 5/2003 | Shiraishi et al. | ........... 290/40 C |
| 2005/0003926 A1 | * | 1/2005 | Hanada et al. | ................ 477/3 |
| 2005/0011690 A1 | * | 1/2005 | Bhavsar et al. | ............. 180/65.2 |
| 2005/0173169 A1 | | 8/2005 | Gray, Jr. | |

* cited by examiner

*Primary Examiner*—Jeffrey J Restifo
*Assistant Examiner*—Erez Gurari
(74) *Attorney, Agent, or Firm*—Julia Voutyras; Alleman Hall McCoy Russell & Tuttle LLP

(57) ABSTRACT

A system and method is disclosed for operating a hybrid propulsion system for a vehicle including at least an engine having a plurality of combustion cylinders, wherein the engine is mechanically coupled to at least a drive wheel of the vehicle, an energy conversion device mechanically coupled to at least one of the engine and the vehicle drive wheel, and an energy storage device coupled to the energy conversion device, the method comprising adjusting at least one of the engine and the energy conversion device so that an amount of energy stored by the energy storage device varies within a first range when the engine is operating in a first combustion mode and varies within a second range when the engine is operating in a second combustion mode, wherein the first range is different from the second range.

13 Claims, 9 Drawing Sheets

DYNAMIC ALLOCATION OF ENERGY STORAGE LIMITS FOR A HYBRID VEHICLE PROPULSION SYSTEM

BACKGROUND AND SUMMARY

Vehicles may include engines configured to use various operating modes in combination with a hybrid powertrain to achieve improved vehicle efficiency. One example is described in U.S. Publication No. 20050173169, which uses a homogenous charge compression ignition combustion (HCCI) engine as one form of autoignition operation. In this system, power production from the HCCI engine in operation may be decoupled from, or assist in, responding to driver power demand. When a driver power demand is greater than what can be provided by the HCCI engine, the addition of power from the motor (e.g. one or more reversible electric motor/generator(s) or reversible hydraulic pump/motor(s)) is used. Likewise, when a driver power demand is less than a value produced by the engine, a portion of power is converted into an energy form storable by an energy storage device.

The inventor herein has recognized a disadvantage with such an approach. Specifically, in some conditions, such as when the power demand is less than a value produced by the engine, the energy storage device is used to absorb the excess output produced by the engine in order to maintain the desired engine operation. However, this approach relies on the availability of sufficient energy storage capacity to absorb the excess engine output. If the energy storage capacity is insufficient, a transition to another operating mode may occur, thereby reducing engine efficiency and increasing products of combustion, under some conditions. Conversely, when the power demand is greater than a value produced by the engine, the energy storage device may be used to provide excess output in order to maintain the desired engine operation. However, this relies on the availability of a sufficient amount stored energy. If the amount of stored energy is insufficient, a transition to another operating mode may occur, again possibly reducing efficiency and/or increasing emissions.

In one approach, the above issues may be addressed by a method of operating a hybrid propulsion system for a vehicle including at least an engine having a plurality of combustion cylinders, wherein the engine is mechanically coupled to at least a drive wheel of the vehicle, an energy conversion device mechanically coupled to at least one of the engine and the vehicle drive wheel, and an energy storage device coupled to the energy conversion device, the method comprising adjusting at least one of the engine and the energy conversion device so that an amount of energy stored by the energy storage device varies within a first range when the engine is operating in a first combustion mode and varies within a second range when the engine is operating in a second combustion mode, wherein the first range is different from the second range.

Thus, it may be advantageous to adjust the operating range, such as the storage limits, of the energy storage device under some conditions to provide sufficient energy storage capacity during some operating modes (e.g. HCCI, cylinder deactivation, etc.), thereby increasing the duration of these operating modes. For example, in a hybrid electric vehicle (HEV), the upper level to where the battery is recharged may be reduced during operation in HCCI mode, thereby enabling sufficient storage capacity for absorbing energy when the requested output is less than the engine output. In another example, the operating range may be adjusted in response to the number of combustion cylinders that are deactivated. In this manner, transitions between various engine modes may be reduced, thereby enabling increased fuel efficiency and decreased levels of NOx production, under some conditions.

DETAILED DESCRIPTION OF THE DRAWINGS

DETAILED DESCRIPTION

Figure 1:
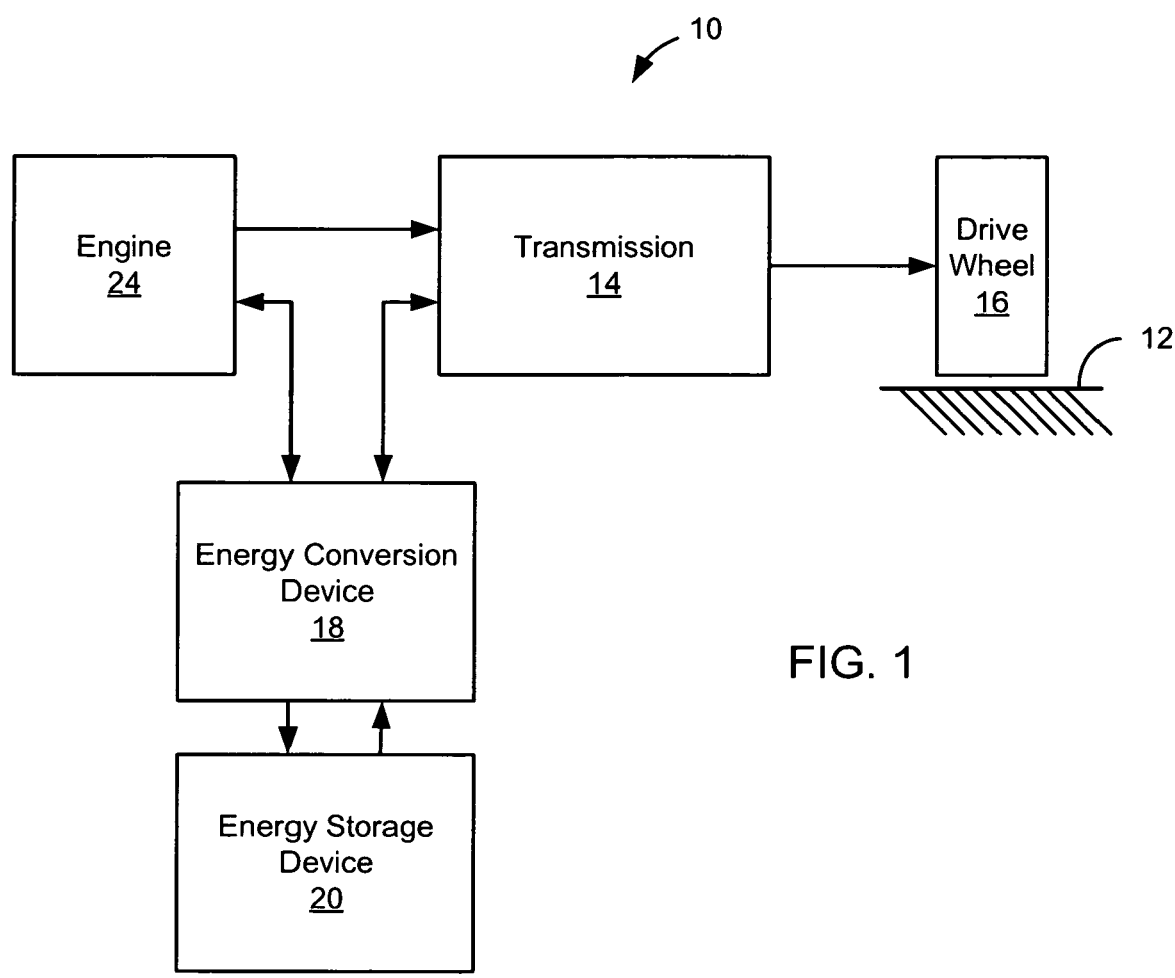
FIG. 1 is a schematic of a vehicle according to the present description.
Figure 2:
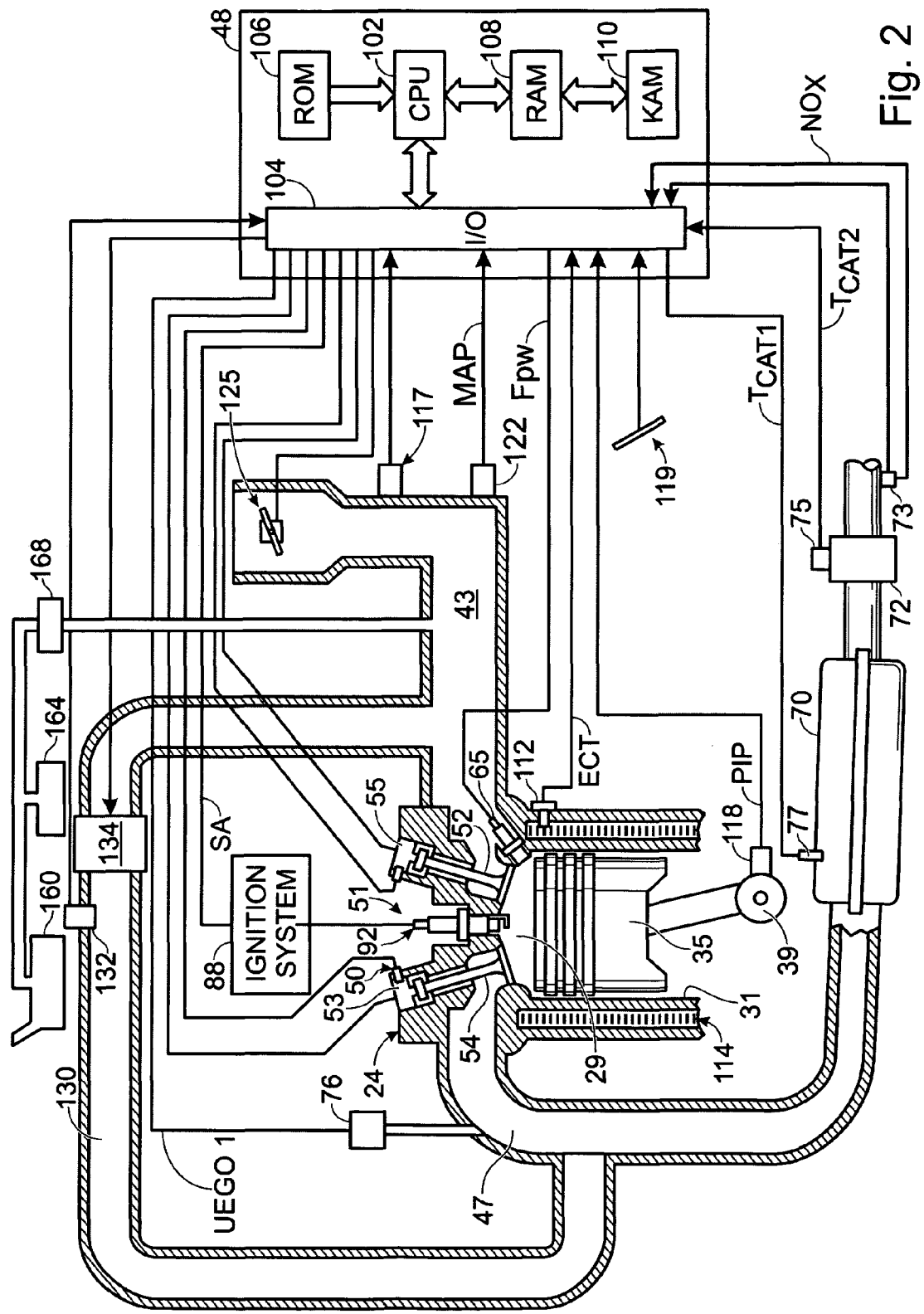
FIG. 2 is a schematic depiction of an internal combustion engine.

Referring to FIG. 1, a hybrid propulsion system for a vehicle is shown including internal combustion engine 24, further described herein with particular reference to FIG. 2, coupled to transmission 14. The transmission 14 may be a manual transmission, automatic transmission, or combinations thereof. Further, various additional components may be included, such as a torque converter, and/or other gears such as a final drive unit, etc. Transmission 14 is shown coupled to drive wheel 16, which in turn is in contact with road surface 12.

In this example embodiment, the hybrid propulsion system also includes an energy conversion device 18, which may include a motor, a generator, among others and combinations thereof. The energy conversion device 18 is further shown coupled to an energy storage device 20, which may include a battery, a capacitor, a flywheel, a pressure vessel, etc. The energy conversion device can be operated to absorb energy from vehicle motion and/or the engine and convert the absorbed energy to an energy form suitable for storage by the energy storage device (i.e. provide a generator operation). The energy conversion device can also be operated to supply an output (power, work, torque, speed, etc.) to the drive wheels 16 and/or engine 24 (i.e. provide a motor operation). It should be appreciated that the energy conversion device may, in some embodiments, include only a motor, only a generator, or both a motor and generator, among various other components used for providing the appropriate conversion of energy between the energy storage device and the vehicle drive wheels and/or engine.

The depicted connections between engine 24, energy conversion device 18, transmission 14, and drive wheel 16 indicate transmission of mechanical energy from one component to another, whereas the connections between the energy conversion device and the energy storage device may indicate transmission of a variety of energy forms such as electrical, mechanical, etc. For example, torque may be transmitted from engine 24 to drive the vehicle drive wheels 16 via transmission 14. As described above energy storage device 18 may be configured to operate in a generator mode and/or a motor mode. In a generator mode, system 18 absorbs some or all of the output from engine 24 and/or transmission 14, which reduces the amount of drive output delivered to the drive wheel 16, or the amount of braking torque to the drive wheel 16. Such operation may be employed, for example, to achieve efficiency gains through regenerative braking, improved engine efficiency, etc. Further, the output received by the energy conversion device may be used to charge energy storage device 20. In motor mode, the energy conversion device may supply mechanical output to engine 24 and/or transmission 14, for example by using electrical energy stored in an electric battery.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. The various components described above with reference to FIG. 1 may be controlled by a vehicle controller as will be describe below with reference to FIG. 2.

FIG. 2 shows one cylinder of a multi-cylinder engine, as well as the intake and exhaust path connected to that cylinder. Internal combustion engine 24 is shown in FIG. 2 as a direct injection gasoline engine with a spark plug; however, engine 24 may utilize port injection exclusively or in conjunction with direct injection. In an alternative embodiment, a port fuel injection configuration may be used where a fuel injector is coupled to intake manifold 44 in a port, rather than directly to cylinder 30.

Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. While only one intake and one exhaust valve are shown, the engine may be configured with a plurality of intake and/or exhaust valves. FIG. 2 merely shows one cylinder of a multi-cylinder engine, and that each cylinder has its own set of intake/exhaust valves, fuel injectors, spark plugs, etc.

In some embodiments, intake valve 52 and exhaust valve 54 may be controlled by electric valve actuators (EVA) 55 and 53, respectively. Alternatively, variable cam timing (VCT) may be used to adjust valve timing. Valve position sensors 50 may be used to determine the position of each of the valves.

In some embodiments, combustion cylinder 29 can be deactivated by at least stopping the supply of fuel supplied to combustion cylinder 29 for at least one cycle. During deactivation of combustion cylinder 29, one or more of the intake and exhaust valves can be adjusted to control the amount of air passing through the cylinder. In this manner, engine 24 can be configured to deactivate one, some or all of the combustion cylinders, thereby enabling variable displacement engine (VDE) operation.

Engine 24 is further shown configured with an exhaust gas recirculation (EGR) system configured to supply exhaust gas to intake manifold 43 from exhaust manifold 47 via EGR passage 130. The amount of exhaust gas supplied by the EGR system can be controlled by EGR valve 134. Further, the exhaust gas within EGR passage 130 may be monitored by an EGR sensor 132, which can be configured to measure temperature, pressure, gas concentration, etc. Under some conditions, the EGR system may be used to regulate the temperature of the air and fuel mixture within the combustion chamber, thus providing a method of controlling the timing of combustion by autoignition.

Engine 24 is also shown having fuel injector 65 coupled thereto for delivering liquid fuel in proportion to the pulse width of signal FPW from controller 48 directly to combustion chamber 29. As shown, the engine may be configured such that the fuel is injected directly into the engine cylinder, which is known to those skilled in the art as direct injection. Distributorless ignition system 88 provides ignition spark to combustion chamber 29 via spark plug 92 in response to controller 48. Universal Exhaust Gas Oxygen (UEGO) sensor 76 is shown coupled to exhaust manifold 47 upstream of catalytic converter 70. Exhaust gas sensor 76 is shown coupled to exhaust manifold 48 upstream of catalytic converter 70. The signal from sensor 76 can be used to advantage during feedback air/fuel control in a conventional manner to maintain average air/fuel at stoichiometry during the stoichiometric homogeneous mode of operation.

FIG. 2 further shows engine 24 configured with an aftertreatment system comprising a catalytic converter 70 and a lean NOx trap 72. In this particular example, temperature Tcat1 of catalytic converter 70 is measured by temperature sensor 77 and temperature Tcat2 of lean NOx trap 72 is measured by temperature sensor 75. Further, gas sensor 73 is shown arranged in exhaust passage 47 downstream of lean NOx trap 72, wherein gas sensor 73 can be configured to measure the concentration of NOx and/or $O_2$ in the exhaust gas.

Controller 48 is shown in FIG. 2 as a conventional microcomputer including: microprocessor unit 102, input/output ports 104, and read-only memory 106, random access memory 108, keep alive memory 110, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a pedal position sensor 119 coupled to an accelerator pedal; a measurement of engine manifold pressure (MAP) from pressure sensor 122 coupled to intake manifold 43; a measurement (ACT) of engine air charge temperature or manifold temperature from temperature sensor 117; and an engine position sensor from a Hall effect sensor 118 sensing crankshaft 39 position. In some embodiments, the requested wheel output can be determined by pedal position, vehicle speed, and/or engine operating conditions, etc. In one aspect of the present description, engine position sensor 118 produces a predetermined number of equally spaced pulses every revolution of the crankshaft from which engine speed (RPM) can be determined.

In some embodiments, controller 48 can be configured to control operation of the various systems described above with reference to FIG. 1. For example, the energy storage device may be configured with a sensor that communicates with controller 48, thereby enabling a determination to be made of the state of charge or quantity of energy stored by the energy storage device. In another example, controller 48 or other controller can be used to vary a condition of the energy conversion device and/or transmission. Further, in some embodiments, controller 48 may be configured to cause combustion chamber 29 to operate in various combustion modes, as described herein. The fuel injection timing may be varied to provide different combustion modes, along with other parameters, such as EGR, valve timing, valve operation, valve deactivation, etc.

Combustion in engine 10 can be of various types/modes, depending on operating conditions. In one example, spark ignition (SI) can be employed where the engine utilizes a sparking device, such as spark plug coupled in the combustion chamber, to regulate the timing of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine torque and speed it may produce increased levels of NOx and lower fuel efficiency when compared with other types of combustion.

Another type of combustion that may be employed by engine 10 uses homogeneous charge compression ignition (HCCI), or controlled autoignition (CAI), where autoignition of combustion chamber gases occurs at a predetermined point after the compression stroke of the combustion cycle, or near top dead center of compression. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of autoignition. The initial intake charge temperature directly affects the timing of autoignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that autoignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach autoignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbo-charging and supercharging), changing the autoignition characteristics of the fuel provided to the engine, and heating the intake air charge (external EGR).

During HCCI combustion, autoignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

Note that a plurality of other parameters may affect both the peak combustion temperature and the required temperature for efficient HCCI combustion. These and any other applicable parameters may be accounted for in the routines embedded in engine controller 48 and may be used to determine optimum operating conditions. For example, as the octane rating of the fuel increases, the required peak compression temperature may increase as the fuel requires a higher peak compression temperature to achieve ignition. Also, the level of charge dilution may be affected by a variety of factors including both humidity and the amount of exhaust gases present in the intake charge. In this way, it is possible to adjust engine parameters to compensate for the effect of humidity variation on autoignition, i.e., the effect of water makes autoignition less likely.

In one particular example, autoignition operation and combustion timing may be controlled by varying intake and/or exhaust valve timing and/or lift to, for example, adjust the amount of residual trapped gasses. Operating an engine in HCCI using the gas trapping method can provide fuel-efficient combustion with extremely low engine out NOx emissions.

However, the achievable HCCI window of operation for low engine speed and/or low engine load may be limited. That is, if the temperature of the trapped gas is too low, then HCCI combustion may not be possible at the next combustion event. If it is necessary to switch out of HCCI and into spark ignition mode during low load in which temperatures may fall too low, and then to return back into HCCI operation once conditions are acceptable, there may be penalties in engine emissions and fuel economy and possible torque/NVH disruption to the driver during each transition. Therefore, in one embodiment, a method that enables additional operation in HCCI or other limited combustion mode at high or low speeds and loads is described herein utilizing an alternative torque source, such as an energy conversion device/generator. Furthermore, extending the low load limit of HCCI operation, for one or more cycles, to obtain increased benefit from HCCI operation may be desirable.

While one or more of the above combustion modes may be used in some examples, still other combustion modes may be used, such as stratified operation, either with or without spark initiated combustion.

Figure 3A:
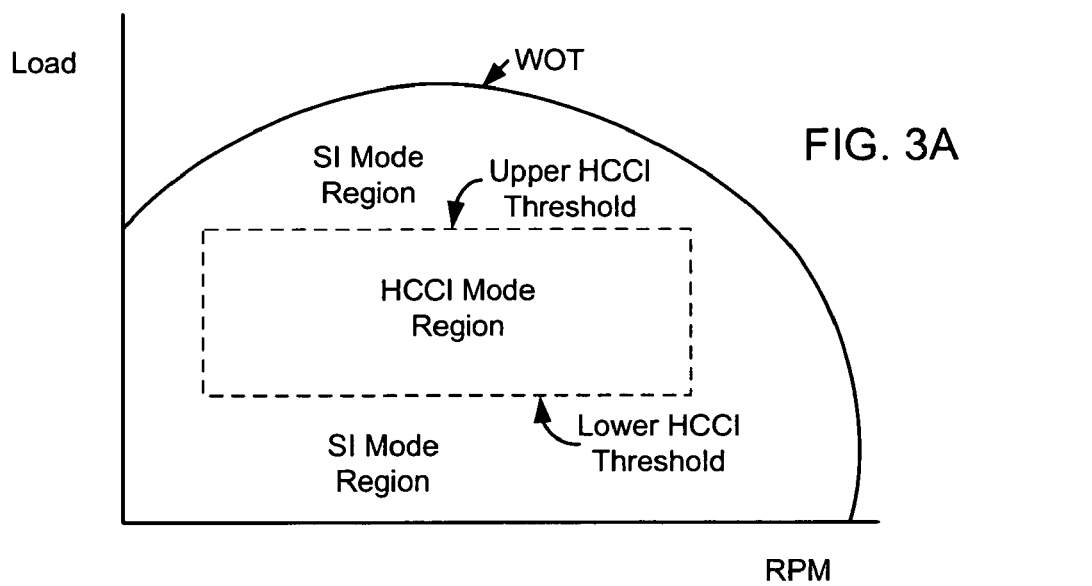
FIGS. 3A-3C are graphs comparing various engine operating conditions to engine load.
Figure 3B:
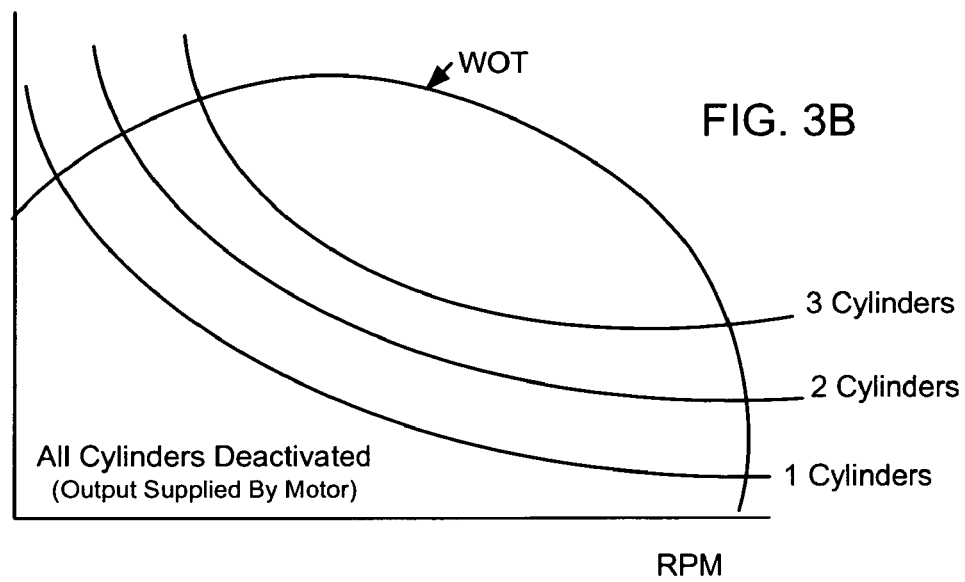
Figure 3C:
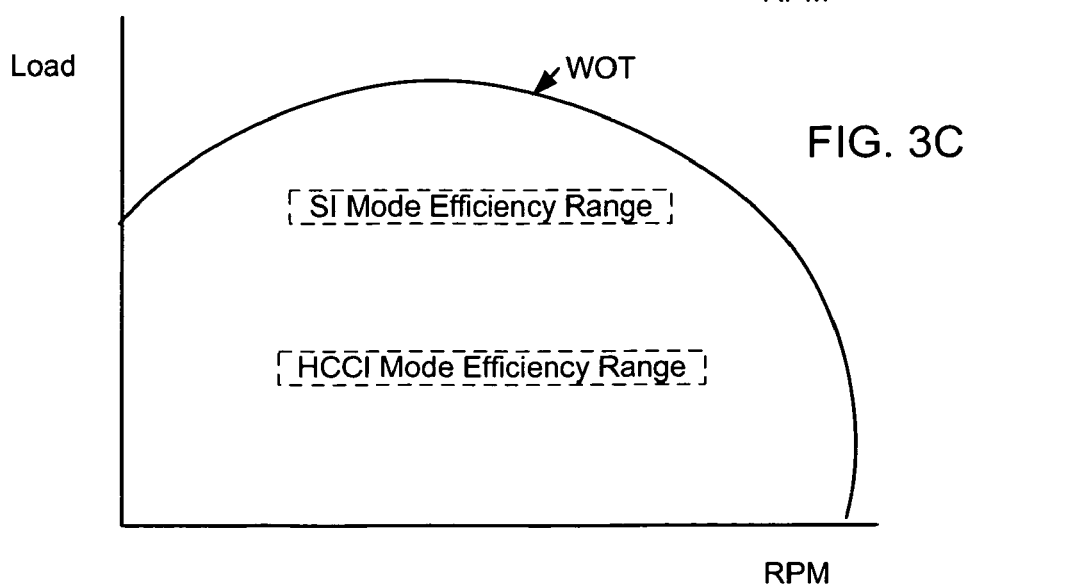

FIGS. 3A-3C show graphs comparing various engine operating conditions to engine load and engine speed. FIG. 3A, for example, shows a graph comparing the SI and HCCI combustion mode regions to wide open throttle (WOT) for an example engine. The graph of FIG. 3A shows engine speed as revolutions per minute (RPM) plotted on the horizontal axis and engine load plotted on the vertical axis. The operating region of the engine described in FIG. 3A is shown to be contained below the WOT curve. The HCCI region is shown as a centrally located region defined by a broken line within the engine operating region and the SI region is shown occupying the higher load regions and the lower load regions surrounding the HCCI region. Further, the HCCI region is shown bounded by an upper output threshold and a lower output threshold. It should be appreciated that FIG. 3A shows just one example of the HCCI operating region as other configurations are possible. Furthermore, it should be understood that the HCCI operating region may differ substantially depending on engine configuration and/or operating conditions. While only two combustion modes are shown in FIG. 3A, the engine may operate with more than two combustion modes.

Further, FIG. 3B shows a similar operating range described above with reference to FIG. 3A. Curves representing a variety of cylinder deactivation configurations are shown for an example 4 cylinder engine. In particular, the upper WOT curve is shown where all of the 4 cylinders are activated (i.e.

carrying out combustion). Each of the lines intersecting the upper WOT curve corresponds to the reduced WOT curve for a particular number of cylinders activated. As shown, when 3 cylinders are activated, the maximum engine output may be reduced. Likewise, as less cylinders are activated, the engine is capable of producing less output. Further, when all of the engine cylinders are deactivated, the engine may rely on the energy conversion device (powered by the energy storage device) to provide output to the drive wheels. FIG. 3B is just one example of an engine configured to deactivate some or all of the combustion cylinder. The various operating regions shown in FIG. 3B may also vary with the mode of the combusting cylinders in the case that some of the cylinders are operating concurrently in different combustion modes (e.g. some cylinders in HCCI mode and some cylinders in SI mode).

FIG. 3C shows a similar operating range described above with reference to FIGS. 3A and 3B. In particular, FIG. 3C shows regions of high efficiency for an example engine configured to operate in SI mode and HCCI mode. For example, engine efficiency may be increased by operating the engine within the HCCI efficiency range during HCCI operation and within the SI efficiency range during SI operation.

The operating regions described by FIGS. 3A-3C show how an engine or cylinder of an engine can be configured to operate in a variety of operating conditions. For example, the engine or cylinder of the engine can operate in SI mode when the engine load is higher or lower than the HCCI region. As shown in FIG. 3A, the engine or cylinder may operate in an HCCI mode when the engine output is greater than the lower HCCI threshold and/or less than the upper HCCI threshold. For example, as the requested wheel output decreases, the engine load may decrease such that the engine approaches the lower limit of the HCCI region. As engine load is further decreased, the engine or cylinder may transition from HCCI mode to SI mode as the engine load becomes less than the lower HCCI threshold, so that reliable combustion may be achieved. Likewise, the engine or cylinder may transition from SI mode to HCCI mode as the engine load again increases above the lower HCCI threshold. Alternatively, under some operating conditions, a supplemental torque apparatus may be used to supply and/or absorb torque so that one or more cylinders may stay within the HCCI operating region, yet the desired torque output may still be achieved.

As noted above, the engine may include a plurality of cylinders and be configured to deactivate one or more of the combustion cylinders. For example, as requested drive wheel output is decreased, cylinders may be progressively deactivated. Alternatively, a bank of cylinders may be deactivated. Accordingly, the energy conversion device or other supplemental torque source may be used to supply some, all, or none of the wheel output during a cylinder deactivation operation, along with appropriate selection of combustion mode. As noted above, deactivation of a cylinder can include stopping fuel delivery to the cylinder for one or more engine cycles and/or holding cylinder intake and/or exhaust valves closed for one or more engine cycles, for example.

During transitions between combustion modes, engine operating conditions may be adjusted as needed so that combustion is achieved in the desired mode. For example, in some embodiments, a transition from SI mode to HCCI mode may include increasing the temperature of the intake air entering the combustion chamber to achieve autoignition of the air and fuel mixture. Likewise, during transitions from HCCI mode to SI mode, the intake air temperature may be reduced so that engine knock does not occur or is reduced. Thus, transitions between combustion modes may use adjustments of, and be based on, engine operating conditions. Operating conditions may include intake air temperature, ambient conditions, EGR contribution, turbocharging or supercharging conditions, intake and/or exhaust valve timing and/or lift, the number of cylinders activated/deactivated, the driver requested output, a condition of the energy storage device, such as battery state of charge (SOC), a condition of a fuel vapor purging system, engine temperature, and/or fuel injection timing, combinations thereof, among others. The engine operating conditions listed above are just some of the many parameters that may be adjusted during operation of the engine and during transitions between combustion modes, or parameters that may be used to trigger such transitions. It should be appreciated that other factors may influence the operation of the engine and vehicle propulsion system.

As described above, transitions between combustion modes may be difficult under some conditions. An engine configured in a hybrid propulsion system or as described above with reference to FIG. 1 may be used to reduce the frequency of transitions between combustion modes and/or between the number of cylinders active or deactivated. In some embodiments, the energy conversion device and energy storage device may be used to absorb excess output produced by the engine. For example, a first portion of the engine output may be delivered to one or more drive wheels and a second portion of the engine output may be converted by the energy conversion device to a form of energy storable by the energy storage device such as a battery, capacitor, pressure vessel, etc. In this manner, one or more cylinders of the engine may operate in HCCI mode when the wheel or engine output is less than a lower HCCI torque threshold. Likewise, when wheel output is greater than an upper HCCI threshold, the energy conversion device may be used to provide a supplemental output so that the engine output may remain below the upper HCCI threshold while still meeting total torque requirements. Therefore, one or more cylinders of the engine may continue operating in HCCI mode as long as a sufficient amount of stored energy is available to operate the energy conversion device to produce the additional wheel output. The term "output" as used herein may be used to describe a variety of output parameters such as power, torque, speed, etc.

While the above examples relate to providing additional HCCI operation of one or more combustion cylinders, it should be appreciated that the same method may be applied to providing additional engine operation (regardless of combustion mode or the number of cylinder activated) within a confined operating range corresponding, as one example, to an operating range of increased efficiency. For example, during operation in SI mode, the energy conversion device and energy storage device may be used to supply and/or absorb engine output as needed in order to maintain a specific operating range where fuel efficiency and/or vehicle emissions are optimized.

During operation of the hybrid vehicle propulsion system described above, the energy storage device may store energy and supply energy as needed to maintain a particular mode of operation (e.g. combustion mode, cylinder configuration, efficient operating range, etc.). For example, as described above, during operation in HCCI mode, if the requested engine output is less than the minimum HCCI threshold, then the engine can produce more output than is needed and the energy storage device can store the excess. However, if the energy storage device does not have sufficient storage capacity to absorb the excess engine output, then the engine may be transitioned out of the desired mode to another less desirable mode such as SI mode and/or the excess energy may be wasted. Alternatively, if the state of charge (SOC) operating range of the energy storage device is adjusted in response to parameters such as the current or predicted combustion mode, cylinder deactivation mode, or efficient operating range, then sufficient energy storage capacity may be maintained, thereby reducing transitions and extending operation in the selected mode.

Figure 3D:
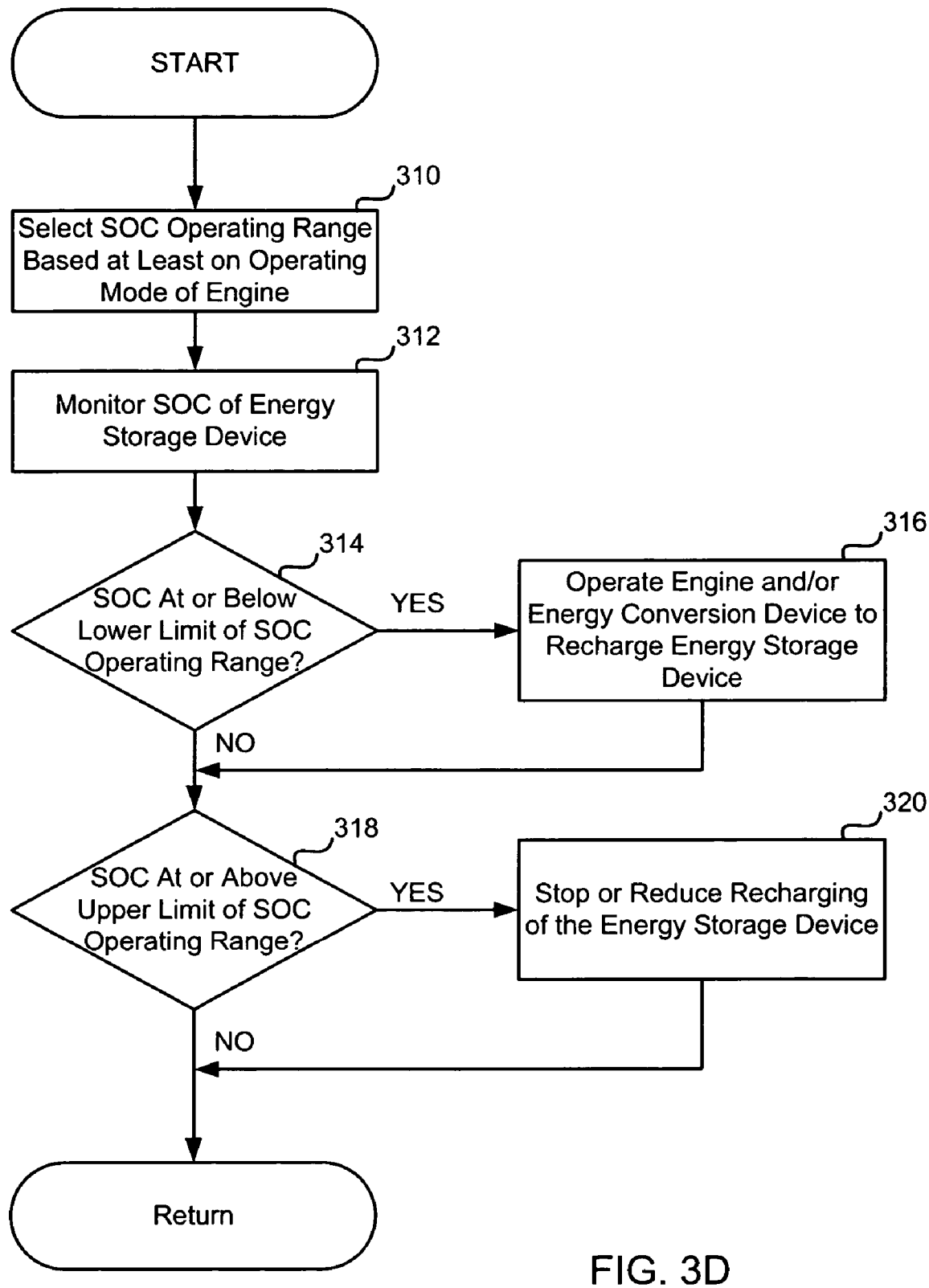
FIG. 3D shows a flow chart depicting an example control method for maintaining a selected operating range of the energy storage device.

FIG. 3D shows an example routine for controlling a recharge operation for the energy storage device. At 310, the SOC operating range of the energy storage device is selected. This operating range may defined by a lower limit and an upper limit. In some embodiments, the SOC operating range may be selected or adjusted in response to an operating mode of the engine. For example, the SOC operating range may be larger during spark ignition operation than during homogeneous charge compression ignition operation. Selection of the SOC operating range will be discussed below in greater detail with reference to FIGS. 6-8. At 312, the SOC of the energy storage device is monitored, which may include the use of a sensor configured to communicate the SOC of the energy storage device to controller 48, for example. As energy is removed from the energy storage device for performing vehicle operations or is added to the energy storage device, such as by regenerative braking, etc., the amount of stored energy (i.e. SOC) may vary.

At 314, it is judged whether the SOC is at or below the lower limit of the SOC operating range. If the answer is yes, the engine and/or energy conversion device may be operated to facilitate a recharge of the energy storage device. For example, the engine output may be increased by adjusting the throttle, adjusting the amount of fuel injected, adjusting the combustion mode of the engine (i.e. transitioning between combustion modes), increasing the number of activated combustion cylinders, etc. In another example, the amount of energy being used by the energy conversion device to supply power to the vehicle drive wheels may be reduced while the engine output is maintained or increased. In yet another example, the energy conversion device may be operated to convert energy from the vehicle motion into a form of energy that can be stored by the energy storage device.

Alternatively, if the answer at 314 is no, it is judged whether the SOC is at or above the upper limit of the SOC operating range (318). If the answer is yes, the energy supplied to energy storage device is stopped or reduced. The recharging operation may be adjusted by reducing the engine output and/or reducing the conversion operation of the energy conversion device. In some embodiments, the engine output may be reduced by deactivating one or more combustion cylinders, adjusting the throttle and/or the amount of fuel injected, transitioning to different combustion mode, etc. Further, the amount of wheel power supplied by the energy conversion device may be increased while the engine output is maintained or reduced, thereby stopping or reducing the recharge operation. Alternatively, if the answer is no, the routine returns to 310. In this manner, the amount of energy stored by the energy storage device may vary within a range, while the engine and/or the energy conversion device can be operated to maintain the limits of the range.

It should be appreciated that the engine output may be adjusted by varying a variety of operating conditions. In addition to operating conditions listed above, the spark timing, combustion timing, EGR amount, valve timing and lift, turbocharger/supercharger contribution, etc. may be varied to further adjust the engine output.

Thus, the operating condition and/or mode of the engine, energy conversion device, and/or transmission may be adjusted in response to the selected range and/or measured SOC of the energy storage device. Further, the selected range or other operating condition of the energy storage device may be adjusted in response to the operating mode of the engine, energy conversion device, and/or transmission, etc.

Figure 4:
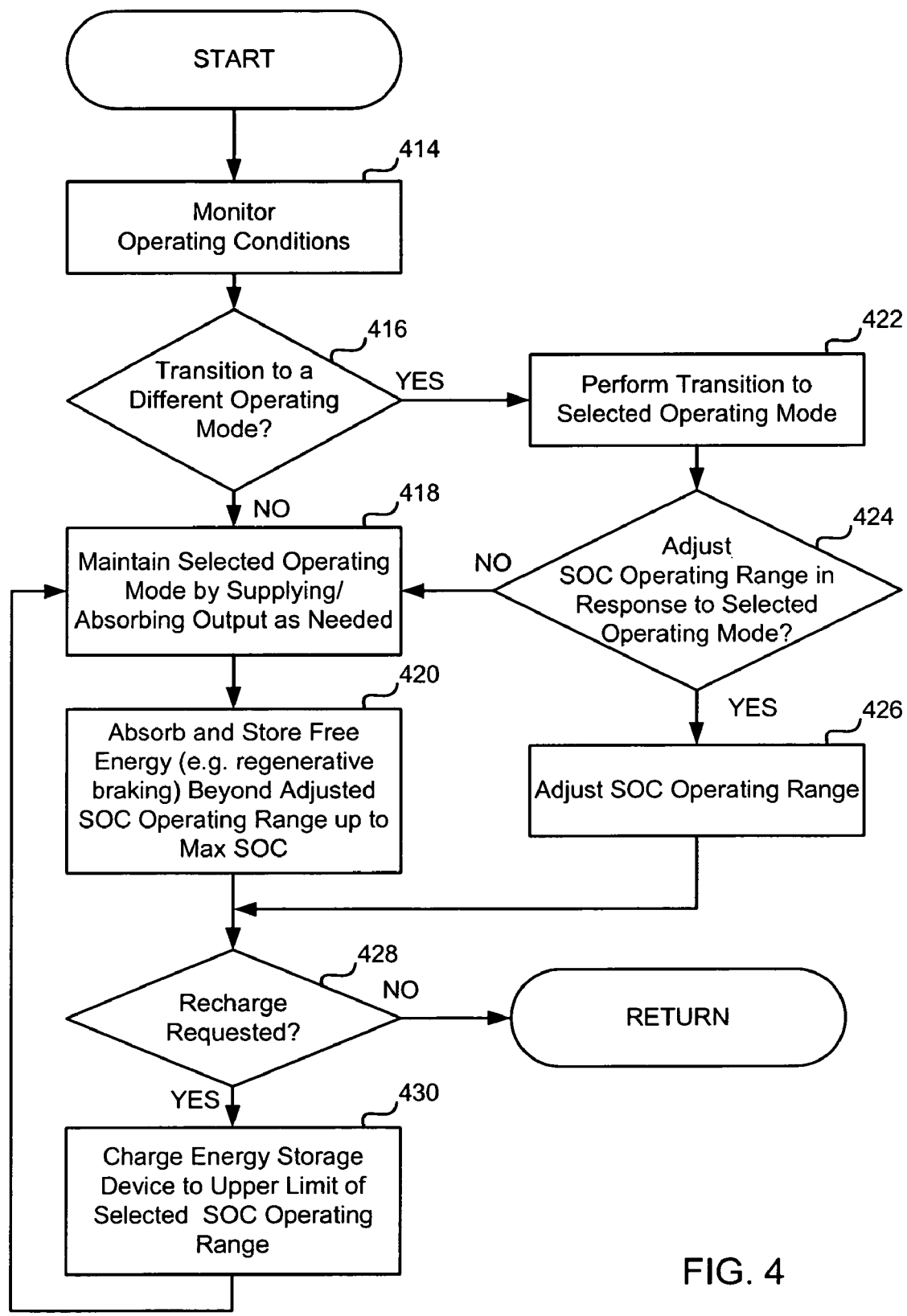
FIGS. 4 and 5 show flow charts depicting an example control method for the hybrid propulsion system.

FIG. 4 shows an example routine for controlling operation of the hybrid propulsion system. The routine begins by monitoring the operating conditions (414) of the propulsion system such as through the various sensors described above among other methods. At 416 it is judged whether a transition to a different operating mode is to be performed in response to the operating conditions. If the answer is no, the routine maintains the selected operating mode by supplying and/or absorbing output as needed (418), while absorbing and storing free energy (e.g. regenerative braking) beyond the selected or adjusted SOC operating range up to the maximum SOC allowable by the energy storage device (420). Alternatively, if the answer at 416 is yes, the routine performs a transition to the selected operating mode (422). In some embodiments, selecting an operating mode (412) may include selecting a combustion mode, selecting a number of activated combustion cylinders, and selecting an engine operating range, among others and combinations thereof.

At 424 it is judged whether an adjustment of the SOC operating range is to be performed in response to the operating mode selected. If the answer is no, the routine proceeds to 418. Alternatively, if the answer is yes, the routine adjusts the SOC operating range of the energy storage device in response to the selected operating mode of the vehicle's hybrid propulsion system. In some embodiments, this adjustment may include varying the upper and/or lower limits of the SOC operating range such that charging of the energy storage device is stopped at or around the upper limit and charging is initiated at or around the lower limit.

After either 420 or 426 are performed, it is judged whether a recharge of the energy storage device is requested (428). If the answer is yes, the energy storage device is charged up to or around the upper limit of the selected SOC operating range. Next, the routine returns to 418. Alternatively, if the answer at 420 is no, the routine returns to 414. It should be appreciated that the methods described above with reference to FIG. 4 can be performed on a per cylinder basis or collectively for all of the combustion cylinders of the engine.

Thus, in some embodiments, adjustments to the SOC operating range of the energy storage device can be determined by comparing the energy requirement to maintain a particular parameter (e.g. combustion mode, etc.) with the frequency and/or duration of such energy use among other operating conditions.

For example, during a recharging operation in HCCI mode, the energy storage device could be charged to a different SOC than during operation in SI mode. In some embodiments, during HCCI mode the energy storage device may be charged up to a lower SOC than would otherwise occur in SI mode, since HCCI mode is often restricted to a smaller operating range than SI mode, under some conditions. Since, HCCI mode may require more frequent and/or more substantial use of the energy storage device, it may be more likely to require additional battery storage capacity. This operation does not only increase future storage capacity, but also may reduce the amount of recharging performed during HCCI or other combustion mode outside of efficient engine operating ranges.

In some embodiments, both the lower and upper limits of the SOC operating range can be adjusted in response to the number of combustion cylinders activated. For example, operation with fewer than all of the cylinders activated could have a smaller SOC range than operation with a greater number of the cylinders activated, since the engine having fewer activated cylinders may be require more substantial and/or more frequent assistance from the energy conversion device and energy storage device to maintain the currently selected operating mode.

In another example, the SOC operating range of the energy storage device can be adjusted in response to the efficiency characteristics of the engine. For example, it may be desirable to operate an engine within a particular operating range of the maximum load or output of the engine in order to achieve increased fuel efficiency. If on the other hand, it is determined that the vehicle operates more often below this efficient operating range, then it may be desirable to reduce the upper SOC limit where recharging of the energy storage device is terminated. In this manner, the free storage capacity of the energy storage device will be increased, thereby prolonging operation in the efficient operating range. Alternatively, if it is determined that the vehicle operates more often above this efficient operating range, then it may be desirable to increase the lower SOC limit where recharging of the energy storage device is initiated. In this manner, the SOC of the energy storage device will be greater, thereby enabling extended operation in the efficient operating range.

In yet another example, during operation in SI mode, the energy storage device may be recharged to a level below or substantially below the maximum storage capacity, thereby ensuring sufficient capacity for receiving "free" energy such as from regenerative braking operations, among others.

The examples provided above provide just a few possibilities of the many ways that the battery limits could be adjusted. It should be appreciated that other configurations and embodiments of the invention are possible since such adjustments to the SOC limitations of the energy storage device are dependant upon engine configuration, engine sizing, efficiency range, combustion mode, cylinder deactivation, etc. and other engine operating conditions, and combinations thereof.

Figure 5:
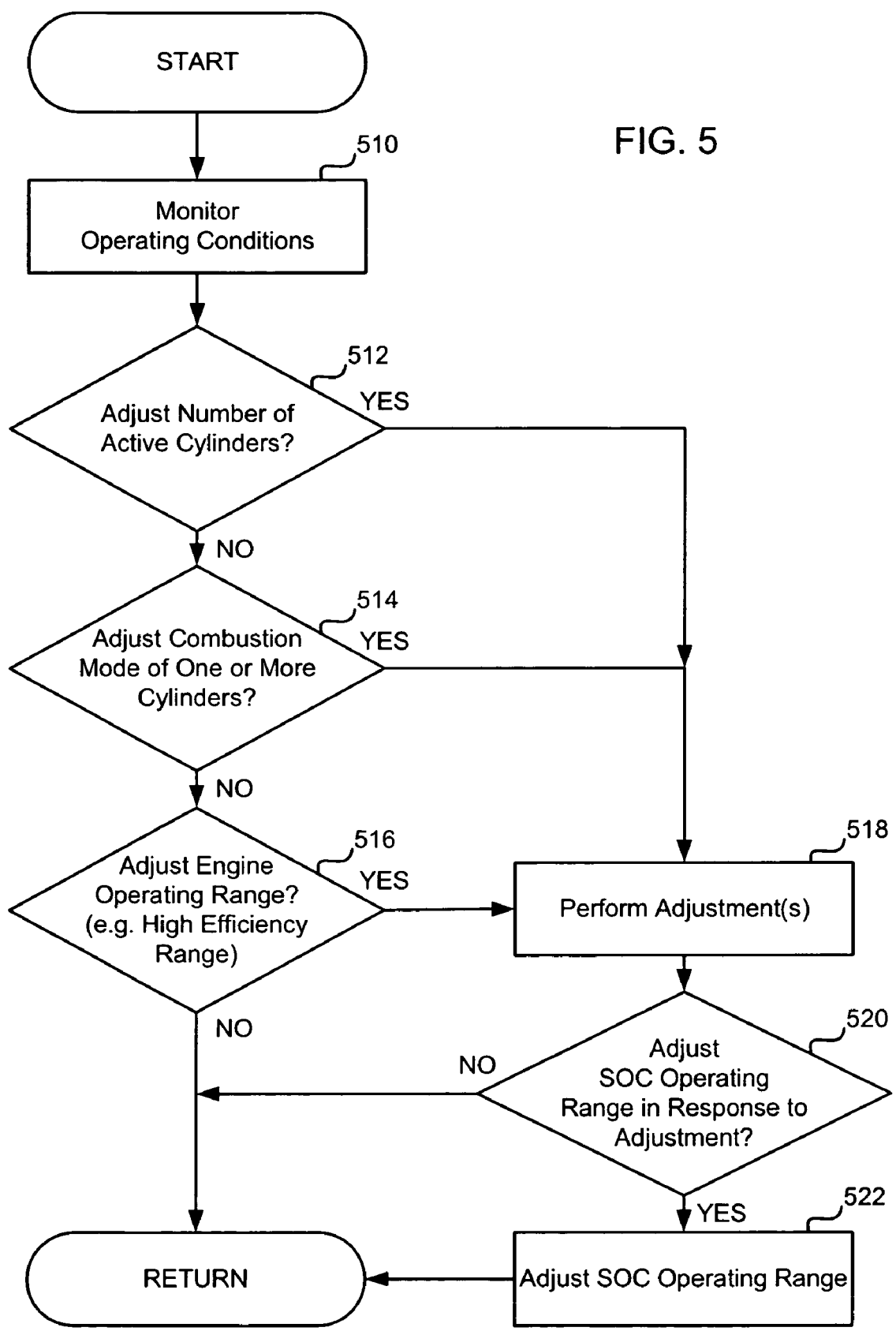

FIG. 5 shows an example routine for controlling operation of the hybrid propulsion system. At 510 operating conditions are monitored. In some embodiments, when changes in the operating conditions of the vehicle, hybrid propulsion system, and/or engine are detected, it may be desirable to adjust one or more of the operating modes described by 512, 514, and 516, among others. For example, at 512 it is judged whether an adjustment of the number of activated cylinders is to be made in response to the operating conditions. If the answer is yes, the routine proceeds to 518. At 514 it is judged whether an adjustment of the combustion mode in one or more cylinders is to be made in response to the operating conditions. If the answer is yes, the routine proceeds to 518. At 516 it is judged whether an adjustment the operating range of the engine is to be made in response to the operating conditions. If the answer is yes, the routine proceeds to 518. It should be appreciated that the combined process of 512, 514, and 516 may be performed in a variety of orders, in parallel, or in series. Alternatively, if no adjustment is to be made at 512, 514, or 516, the routine returns to 510.

At 518 the selected adjustment is performed. Next, at 520 it is judged whether an adjustment of the SOC operating range is to be made in response to the adjustment performed in 518. If the answer is no, the routine returns to 510. Alternatively, if the answer is yes, an adjustment of the SOC operating range is made (522). The adjustment to the SOC operating range performed in 522 may take into account a variety of conditions when varying the upper and/or lower limits of the SOC operating range. For example, in some embodiments, the frequency, rate, and/or likelihood of energy being supplied and/or absorbed by the energy storage device may be considered in conjunction with other operating conditions and factors. Next, the routine returns to 510.

Figure 6:
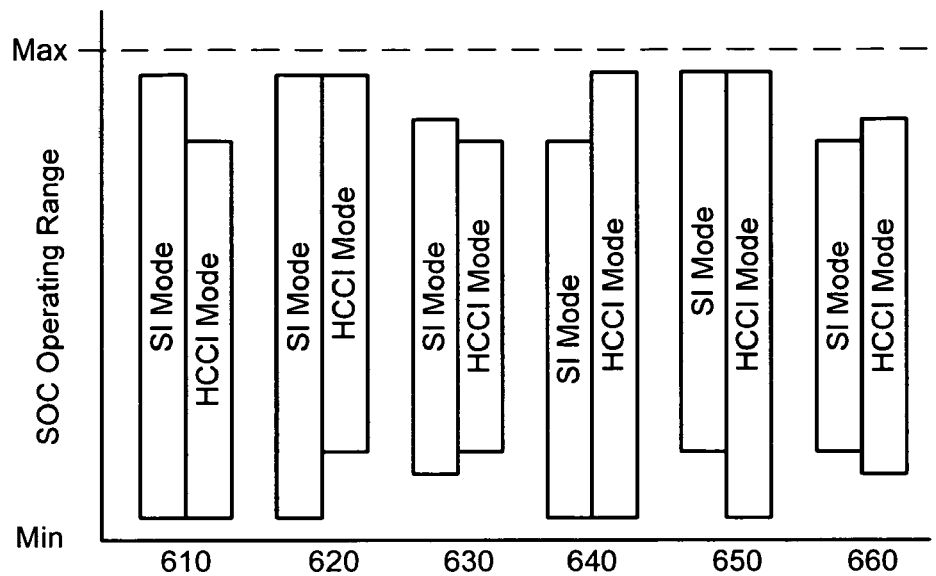
FIGS. 6-8 are graphs comparing example SOC ranges for several operating conditions.
Figure 7:
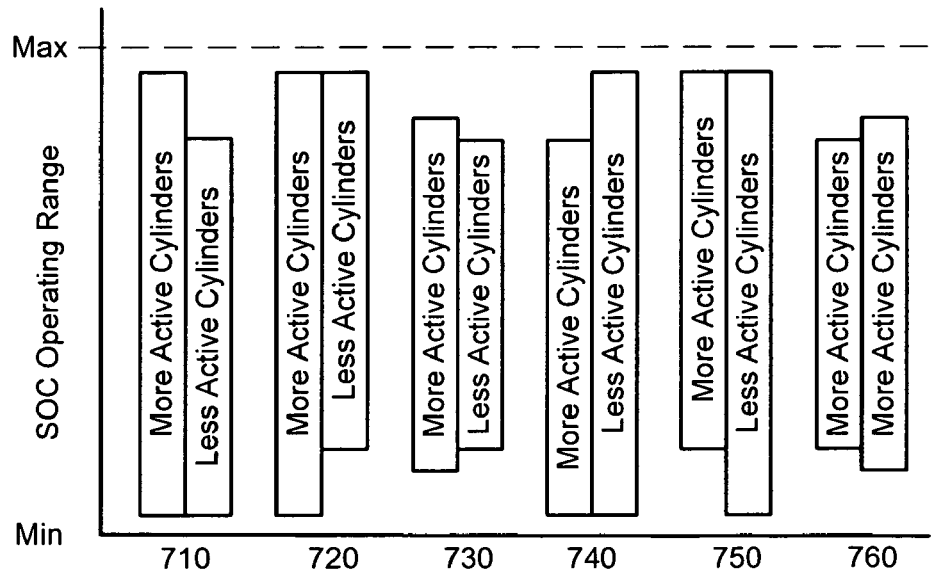
Figure 8:
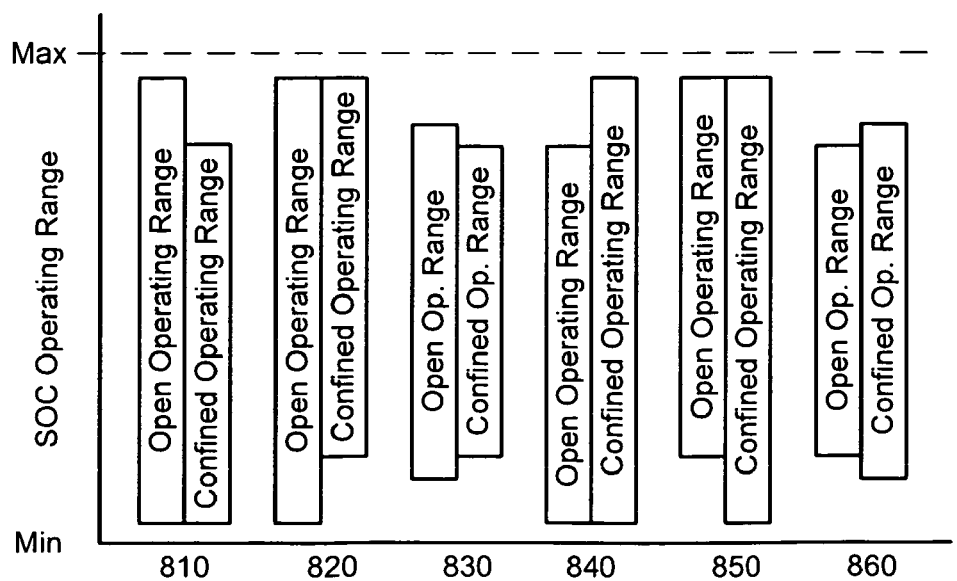

Referring now to FIGS. 6-8, example SOC operating ranges for various operating conditions are shown. Specifically, FIG. 6 shows example SOC operating ranges based on combustion mode. 610-630 show how engine operation in SI mode may have a larger SOC operating range than during operation in HCCI mode. In particular, 610 shows SI mode having a higher upper limit than HCCI mode, while 620 shows SI mode having a lower limit than HCCI mode. Further, 630 shows SI mode having both a higher and lower limit than HCCI mode. Alternatively, 640-660 show how HCCI mode may have higher, lower, or broader SOC operating limits than during operation in SI mode.

Likewise, FIG. 7 shows example SOC operating ranges based on the number of activated cylinders (i.e. carrying out combustion). For example, 710-730 show how the engine operating with more activated cylinders may have a larger SOC operating range than the engine operating with less activated cylinders. 710 shows operation with more activated cylinder configuration having a higher upper limit than the configuration with less activated cylinders, while 720 shows the more activated cylinder configuration having a lower limit than the configuration with less activated cylinders. Further, 730 shows how the engine operating with more activated cylinders may have both a higher and lower limit than the configuration with less activated cylinders. Alternatively, 740-760 show how an engine operating with lower number of activated cylinders may have higher, lower, or broader SOC operating limits than during engine operation with a greater number of activated cylinders.

Likewise, FIG. 8 shows example SOC operating ranges based on the assigned or desired operating range of the engine. For example, under some conditions it may be desirable to operate the engine within a high efficiency operating range, described herein as the confined operating range. The open operating range described herein refers to the engine being configured to produce an output across substantially the entire output range of the engine. Examples, 810-830 show how the engine operating in an open range (i.e. not confined) may have a larger SOC operating range than the engine operating in a specifically confined operating range. Example 810 shows the open range having a higher upper limit than the confined range, while example 820 shows the open range having a lower limit than the confined range. Further, example 830 shows how the engine operating over a an open operating range may have both a higher and lower limit than when confined to a substantially narrower range of output. Alternatively, 840-860 show how a confined engine operating range may have higher, lower, or broader SOC operating limits than during engine operation that is unconfined.

While the examples provided above with reference to FIG. 6-8 show various SOC operating ranges in response to engine mode (e.g. combustion mode, cylinder deactivation, and/or engine operation range), it should be appreciated that other responses may exist. For example, the HCCI mode may utilize a larger SOC operating range than during SI mode. In another example, the SOC operating range may be smaller during operation with more cylinders activated than during operation with less cylinders activated. In some embodiments, the engine operating mode and/or SOC operating range may be varied in response to a condition of the energy storage device. For example, the temperature of the energy storage device may be used to select and/or vary the SOC operating range. In another example, the combustion mode of the engine may be varied in response to the battery state of charge.

Figure 9:
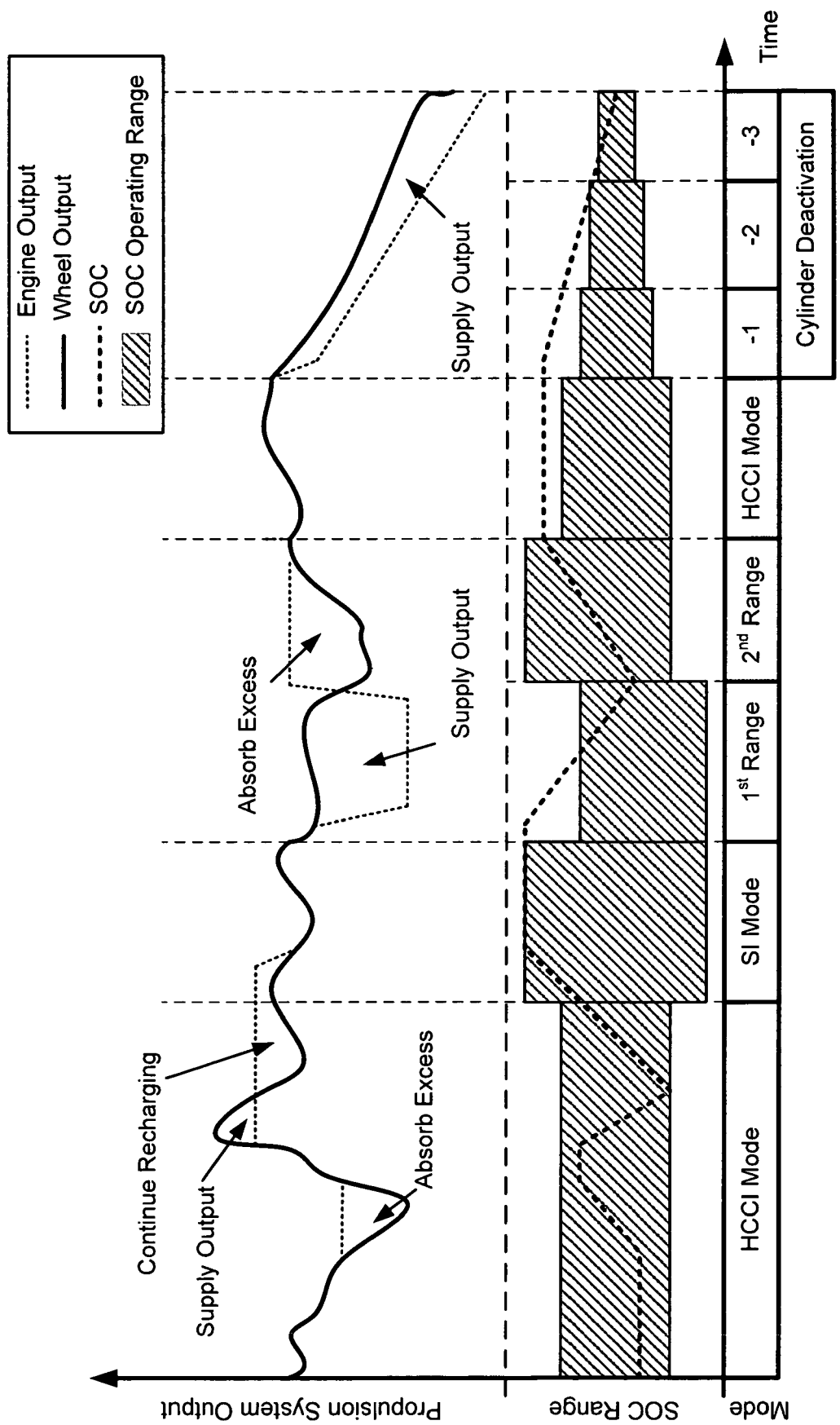
FIGS. 9 and 10 are graphs showing example applications of the methods described herein.

FIG. 9 shows one example implementation of the methods described above. Specifically, FIG. 9 shows a graph having a horizontal axis corresponding to time and a vertical axis corresponding to output of the engine and drive wheel as well as the selected SOC operating range. It should be appreciated that FIG. 9 is provided herein to further illustrate these methods and is therefore just one example application as other possibilities may exist.

As shown in the key accompanying FIG. 9, wheel output is shown as a solid black line while the corresponding engine output is shown as a light broken line. Further, the corresponding SOC and SOC operating range are shown below as a heavy broken line and shaded region, respectively. As described above, the SOC of the energy storage device may be generally confined to the shaded SOC operating range. The bottom of the graph shows at least one aspect of the hybrid propulsion system operating mode (e.g. combustion mode, cylinder deactivation, etc.).

Beginning on the left end of the graph, the engine is shown operating in HCCI mode. Further, the wheel output and the engine output are shown to substantially similar until the wheel output become substantially less than the engine output, wherein the excess engine output may be absorbed by the energy conversion device and energy storage device. Continuing to the right, the engine output again varies from the wheel output such that the engine output is supplemented with an output supplied by the energy conversion device. As described above with reference to FIG. 3, such supplying and absorbing of output may be used to maintain or prolong operation in HCCI mode or other engine mode. As the energy conversion device removes energy from the energy storage device while supplying wheel output or adds energy to the energy storage device while absorbing output from the engine and/or transmission, the SOC is shown to vary accordingly. During HCCI mode, the SOC is shown approaching the lower limit of the SOC operating range. Therefore, the energy conversion device is operated to add energy thereby recharging the energy storage device to the upper limit or to a SOC within the SOC operating range of the energy storage device.

Next, the engine is shown operating in SI mode. In response to the transition between combustion modes, the SOC operating range of the energy storage device has been adjusted to be larger (e.g. has an extended lower limit and higher upper limit). As the SOC is shown reaching the upper limit of the SOC operating range, the charging operating is terminated, wherein the engine returns to producing the driver requested wheel output. Continuing to the right, the engine is then shown entering a first confined operating range, which may correspond to high or increased efficiency range for a particular mode. For example, the engine may be configured to operate at a substantially steady state output regardless of the output delivered to the drive wheels. As such, the upper limit of the SOC operating range can be adjusted to reflect this transition. Further, the engine output is shown departing from the wheel output as the engine maintains output at a substantially steady state output. Thus, the difference between the engine output and the wheel output may be supplied by the energy conversion device and the energy storage device; hence, the SOC is shown decreasing during the first confined range.

Next, the engine is shown transitioning to a mode where a second confined range is performed. As such, the engine is shown operating at a second substantially steady state operating range, while the energy conversion device is used to absorb excess output produced by the engine. Therefore, the SOC is shown to increase as energy is added to the energy storage device. While these examples illustrate a confined engine operating range having a substantially steady state output, other ranges may exist. For example, the engine may be configured to operate within a band of increased engine efficiency or a band where reduced production NOx or other combustion product(s) occurs.

Continuing further to the right, the engine is shown to again transition to HCCI mode. As such, the SOC operating range is adjusted in response to the combustion mode transition. It should be appreciated that the adjustment to the upper limit of the SOC operating range may not necessarily affect the SOC when it is above the upper limit of SOC operating range. Therefore, the energy storage device may remain at an elevated state of charge until the stored energy is utilized by a subsequent vehicle operation. Next, some of the combustion cylinders of the engine are deactivated. For example, "−1" corresponds to a first cylinder of a plurality of cylinders being deactivated. In response, the SOC operating range may be adjusted accordingly. As subsequent cylinders are deactivated (i.e. "−2" and "−3"), the SOC operating range can be further adjusted. As cylinders are deactivated, the displacement of the engine is reduced; therefore, supplemental output from the energy conversion device may be used so that the requested wheel output is maintained.

Figure 10:
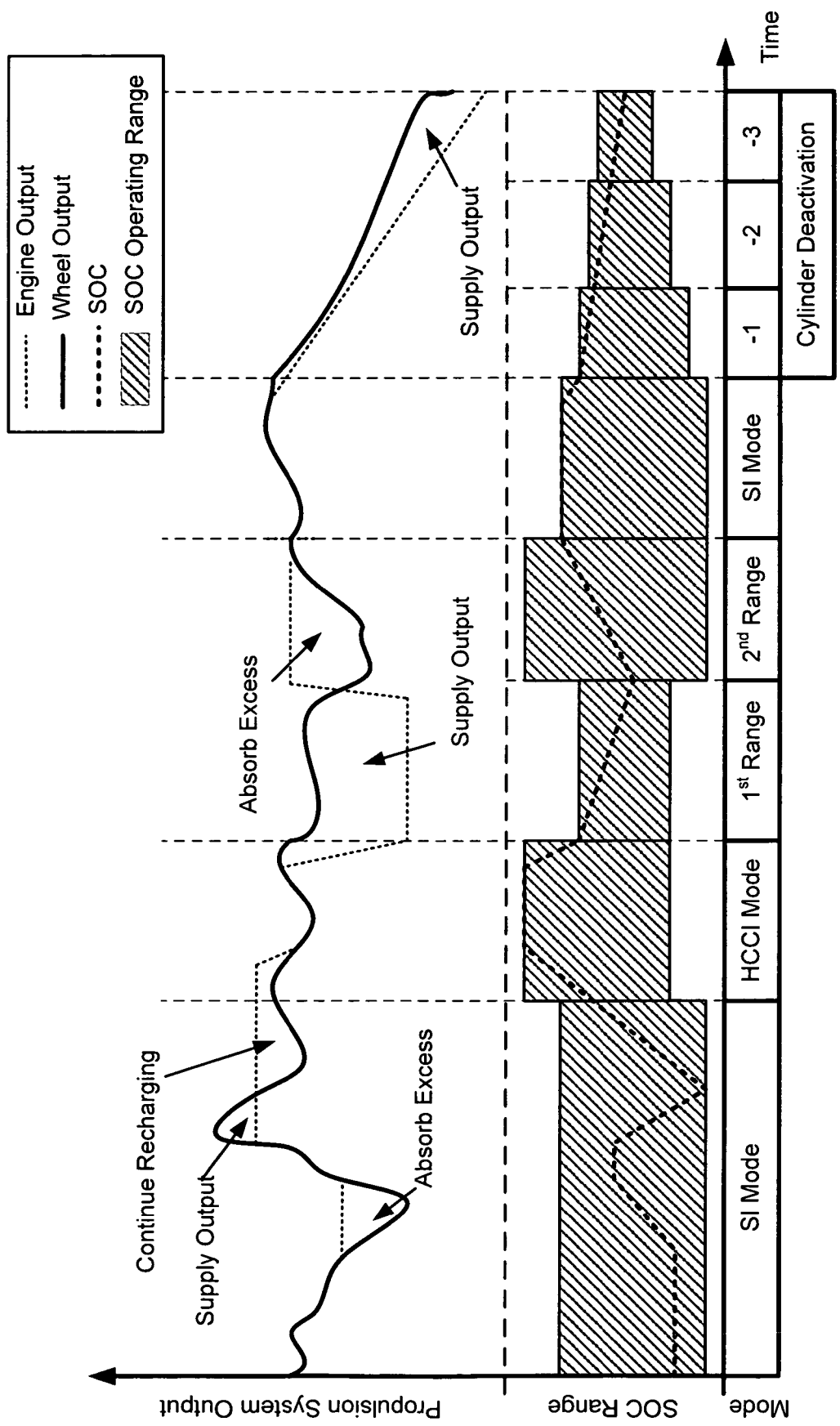

FIG. 10 shows a similar graph as described above with reference to FIG. 9. However, while FIG. 9 shows the SOC of the energy storage device to occasionally exceed the upper limit of the SOC operating range, FIG. 10 shows an example operation where the upper limit of the SOC operating range is more strictly enforced. For example, prior to and/or during the transition from HCCI mode to the first confined engine operation, the energy conversion device may be operated to supply an output, thereby reducing the SOC of the energy storage device to within the upper limit of the SOC operating range. Likewise, FIG. 10 shows the energy conversion device supplying an output prior to deactivating a combustion cylinder, thereby maintaining a SOC of the energy storage device within the upper and lower limits. Furthermore, it should be appreciated that FIG. 10 shows some differences with regards to how the SOC operating range is adjusted in response to combustion mode, cylinder deactivation, and confined engine operating ranges.

As described above with reference to FIG. 9, the SOC may remain at a level elevated above the upper limit of the SOC operating range, under some conditions. However, during some conditions, this upper limit may be more strictly enforced, wherein the energy conversion device may be operated to reduce the SOC to within the SOC operating range as shown in FIG. 10. While FIG. 9 shows several adjustments to the SOC operating range as described above with reference to FIGS. 6-9, it should be appreciated that different adjustments or manipulations of the SOC operating range may exist. Furthermore, it should be appreciated that portions of FIGS. 9 and 10 are for illustrative purposes and may not be to scale.

Note that the example control and estimation routines included herein can be used with various engine and/or hybrid propulsion system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 48.

It will be appreciated that the configurations and routines disclosed herein are exemplary in nature, and that these specific embodiments are not to be considered in a limiting sense, because numerous variations are possible. For example, the above technology can be applied to V-4, V-6, V-8, I-4, I-6, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating a hybrid propulsion system for a vehicle including at least an engine having a plurality of combustion cylinders, wherein the engine is configured to deactivate at least one combustion cylinder, wherein the engine is mechanically coupled to at least a drive wheel of the vehicle; an energy conversion device mechanically coupled to at least one of the engine and the vehicle drive wheel; and an energy storage device coupled to the energy conversion device, the method comprising:

varying a number of deactivated combustion cylinders;

adjusting at least one of the engine and the energy conversion device so that an amount of energy stored by the energy storage device varies within a first range when the engine is operating with a first number of deactivated combustion cylinders and varies within a second range when the engine is operating with a second number of deactivated combustion cylinders, wherein the first range is different from the second range; and adjusting at least one of the first range and the second range in response to energy supplied to the energy storage device during a regenerative braking operation, the energy conversion device further configured to provide the regenerative braking of the vehicle by converting energy received from the drive wheel into energy storable by the energy storage device.

2. The method of claim 1, further comprising adjusting at least one of the first range and the second range in response to temperature of the energy storage device.

3. The method of claim 1, further comprising varying the number of deactivated combustion cylinders in response to the amount of energy stored by the energy storage device.

4. The method of claim 1, wherein the engine is configured to selectively operate within a confined operating band, wherein the operating band corresponds to an engine output where a substantially high engine efficiency is achieved, wherein at least one of the first range and the second range are varied in response to the confined operating band.

5. A method of operating a hybrid propulsion system for a vehicle having at least an internal combustion engine configured to operate in a plurality of combustion modes, and a battery configured to be recharged by at least the engine, the method comprising:

during a first mode, operating the engine in a homogeneous charge compression ignition mode and charging the battery to a first state of charge;

during a second mode, operating the engine in a spark ignition mode and charging the battery to a second state of charge different from the first state of charge; and adjusting at least one of the first and the second states of charge of the battery in response to a number of deactivated combustion cylinders, the engine including a plurality of combustion cylinders where at least some of the combustion cylinders are configured to be deactivated.

6. The method of claim 5, wherein the first state of charge is less than the second state of charge.

7. The method of claim 5, further comprising selecting a combustion mode of the engine in response to a state of charge of the battery.

8. The method of claim 5, wherein the battery is further configured to be recharged by regenerative braking of the vehicle; wherein at least one of the first and the second state of charge are increased in response to energy received from the regenerative braking operation.

9. The method of claim 5, wherein the engine is configured to selectively operate within a substantially narrow operating range, wherein at least one of the first state of charge and the second state of charge are varied in response to the substantially narrow operating range.

10. A method of operating a hybrid propulsion system for a vehicle including at least an engine having a plurality of combustion cylinders, wherein the engine is configured to deactivate at least one combustion cylinder, wherein the engine is mechanically coupled to at least a drive wheel of the vehicle; an energy conversion device mechanically coupled to at least one of the engine and the vehicle drive wheel; and an energy storage device coupled to the energy conversion device, the method comprising:

varying a number of deactivated combustion cylinders;

adjusting at least one of the engine and the energy conversion device so that an amount of energy stored by the energy storage device varies within a first range when the engine is operating with a first number of deactivated combustion cylinders and varies within a second range when the engine is operating with a second number of deactivated combustion cylinders, wherein the first range is different from the second range; and varying at least one of the first range and the second range in response to a confined operating band within which the engine is configured to selectively operate, the operating band corresponding to an engine output where a substantially high engine efficiency is achieved.

11. The method of claim 10, further comprising adjusting at least one of the first range and the second range in response to temperature of the energy storage device.

12. The method of claim 10, further comprising varying the number of deactivated combustion cylinders in response to the amount of energy stored by the energy storage device.

13. The method of claim 10, wherein the energy conversion device is further configured to provide regenerative braking of the vehicle by converting energy received from the drive wheel into energy storable by the energy storage device; wherein at least one of the first range and the second range are adjusted in response to energy supplied to the energy storage device during the regenerative braking operation.

* * * * *